(12) United States Patent
Naether et al.

(10) Patent No.: US 8,978,457 B2
(45) Date of Patent: Mar. 17, 2015

(54) SENSOR MODULE FOR A MASTER CYLINDER

(75) Inventors: Niko Naether, Nastaetten (DE);
Thomas Baron, Leimbach (DE);
Karl-Heinz Schaust, Fachbach (DE);
Klaus Ullmer, Koblenz (DE); Josef Knechtges, Mayen (DE)

(73) Assignee: Lucas Automotive GmbH, Koblenz (DE)

(*) Notice: Subject to any disclaimer, the term of this patent is extended or adjusted under 35 U.S.C. 154(b) by 214 days.

(21) Appl. No.: 13/810,240

(22) PCT Filed: Jul. 15, 2011

(86) PCT No.: PCT/EP2011/003549
§ 371 (c)(1),
(2), (4) Date: Mar. 20, 2013

(87) PCT Pub. No.: WO2012/007176
PCT Pub. Date: Jan. 19, 2012

(65) Prior Publication Data
US 2013/0205881 A1    Aug. 15, 2013

(30) Foreign Application Priority Data
Jul. 16, 2010 (DE) .......................... 10 2010 027 308

(51) Int. Cl.
*G01M 17/007* (2006.01)
*B60T 17/22* (2006.01)
(Continued)

(52) U.S. Cl.
CPC ................. *B60T 17/22* (2013.01); *B60T 7/042* (2013.01); *B60T 11/16* (2013.01); *B60T 13/52* (2013.01); *G01L 5/28* (2013.01)

USPC ........................................................... 73/129

(58) Field of Classification Search
USPC .................................................... 73/121, 129
See application file for complete search history.

(56) References Cited

U.S. PATENT DOCUMENTS

| 5,711,204 A | 1/1998 | Michels |
| 5,725,291 A | 3/1998 | Michels |

(Continued)

FOREIGN PATENT DOCUMENTS

| CN | 101622150 A | 1/2010 |
| DE | 19855358 A1 | 6/2000 |

(Continued)

OTHER PUBLICATIONS

Chinese First Search Report, Application No. 201180043645.8, dated Jul. 29, 2014.

*Primary Examiner* — Eric S McCall
(74) *Attorney, Agent, or Firm* — MacMillan, Sobanski & Todd, LLC

(57) ABSTRACT

A sensor module for use with a master cylinder of a brake system is described, wherein the master cylinder has an input-side activation element and an underpressure region for communicating with an underpressure brake booster. The sensor module comprises an underpressure sensor for detecting an underpressure in the underpressure region of the master cylinder as well as at least one further sensor for detecting a signal transmitter which is rigidly coupled to the activation element. The underpressure sensor and the at least one further sensor are accommodated in a housing of the sensor module. An opening in the housing permits communication between the underpressure sensor and the underpressure region of the master cylinder.

25 Claims, 10 Drawing Sheets

(51) Int. Cl.
  *B60T 7/04*     (2006.01)
  *B60T 11/16*    (2006.01)
  *B60T 13/52*    (2006.01)
  *G01L 5/28*     (2006.01)

(56) References Cited

U.S. PATENT DOCUMENTS

| | | | |
|---|---|---|---|
| 6,253,656 | B1 | 7/2001 | Gilles |
| 8,063,627 | B2 | 11/2011 | Cagnac et al. |
| 8,511,758 | B2 * | 8/2013 | Sano et al. ................ 303/114.1 |
| 2003/0205931 | A1 | 11/2003 | Muller et al. |
| 2008/0290725 | A1 * | 11/2008 | Bach et al. ........................ 303/3 |
| 2008/0312801 | A1 | 12/2008 | Muller et al. |
| 2009/0140572 | A1 * | 6/2009 | Kim ................................ 303/17 |
| 2010/0036577 | A1 | 2/2010 | Kodama et al. |
| 2011/0074209 | A1 * | 3/2011 | Ueno ............................... 303/20 |
| 2012/0297887 | A1 * | 11/2012 | Kim ................................ 73/753 |
| 2013/0226424 | A1 * | 8/2013 | Knechtges et al. ............. 701/70 |
| 2014/0144223 | A1 * | 5/2014 | Knechtges et al. ............. 73/132 |

FOREIGN PATENT DOCUMENTS

| | | |
|---|---|---|
| DE | 10218972 A1 | 2/2003 |
| DE | 102004013191 A1 | 10/2005 |
| EP | 0706924 A1 | 4/1996 |
| EP | 2072969 A1 | 5/2009 |
| WO | 0243996 A1 | 6/2002 |

* cited by examiner

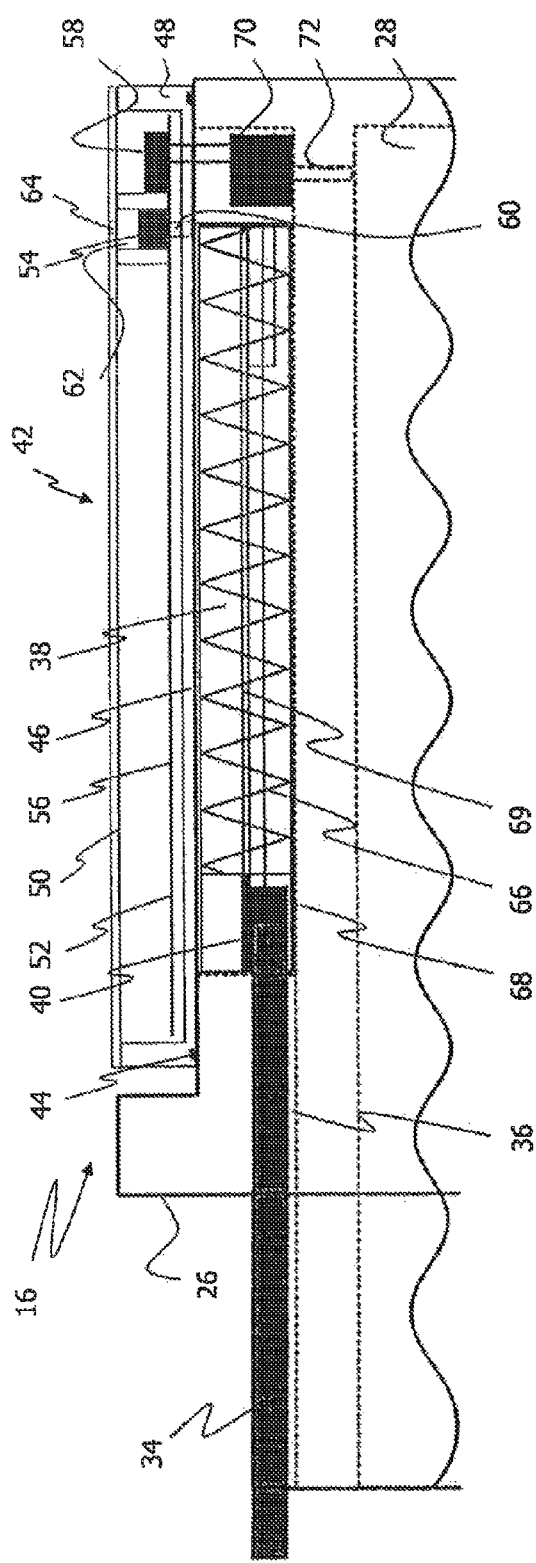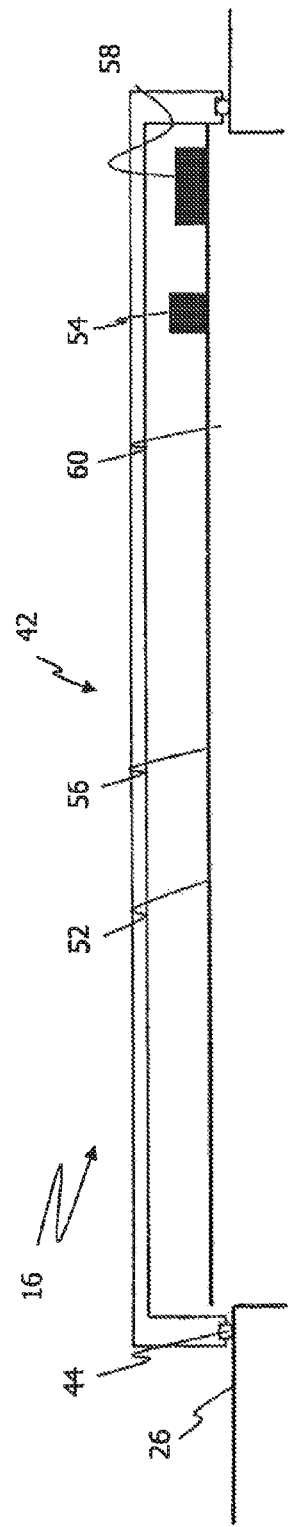

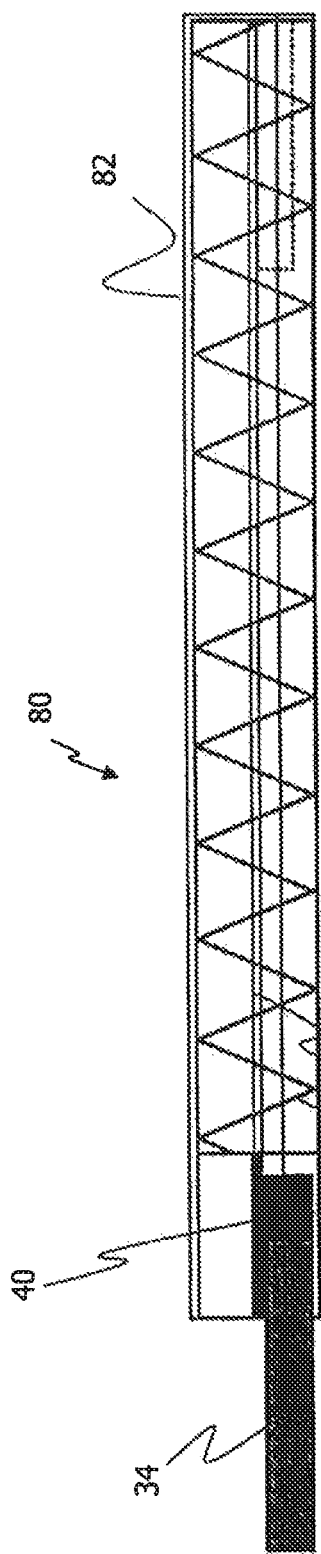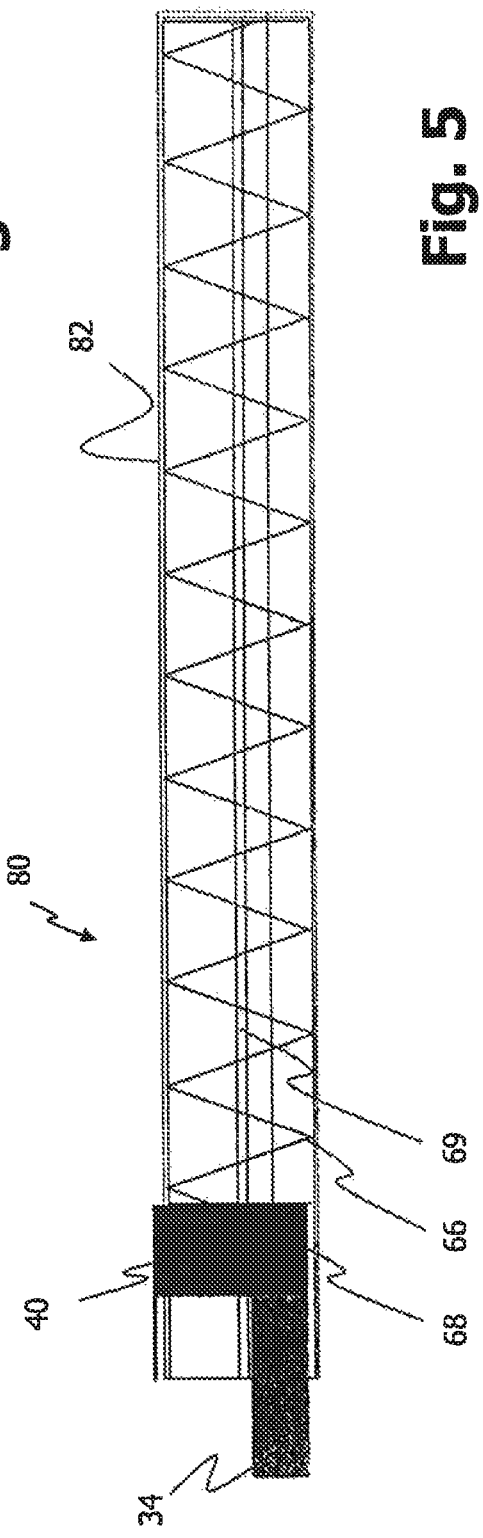

US 8,978,457 B2

SENSOR MODULE FOR A MASTER CYLINDER

CROSS-REFERENCE TO RELATED APPLICATIONS

This application is a national stage of International Application No. PCT/EP2011/003549 filed Jul. 15, 2011, the disclosures of which are incorporated herein by reference in entirety, and which claimed priority to German Patent Application No. DE 10 2010 027 308.2 filed Jul. 16, 2010, the disclosures of which are incorporated herein by reference in entirety, and is related to co-pending U.S. application Ser. No. 13/810,241.

BACKGROUND OF THE INVENTION

The present disclosure generally relates to the field of motor vehicle braking systems. More precisely, a sensor module for use with a master cylinder of a braking system is described.

Underpressure brake boosters are used in motor vehicles in order to amplify the foot force applied by the driver to a brake pedal. A conventional underpressure brake booster has an underpressure chamber and an operating chamber which are separated from each other by a piston which is in the form of a diaphragm. The diaphragm is in turn connected in a power-transmitting manner to an input-side activation element of a master cylinder on which the foot force applied by the driver also acts.

During the driving operation, an underpressure is constantly maintained in the underpressure chamber whilst the operating chamber may selectively be connected to the underpressure chamber or to atmospheric pressure. If the two chambers are connected to each other, the same pressure is present in the two chambers and the diaphragm is located in its initial position. In the context of a braking operation, the operating chamber is fluidically separated from the underpressure chamber and the operating chamber is further connected to atmospheric pressure. The resultant pressure increase in the operating chamber results in a pressure difference at the diaphragm. That pressure difference in turn brings about a displacement of the diaphragm in the direction of the underpressure chamber and therefore an amplification force at the activation element of the master cylinder.

In order to assess the performance of an underpressure brake booster, it is desirable to monitor the pressure in the underpressure chamber with sensors. In previous monitoring solutions, an underpressure sensor is fitted to the brake booster in order to establish the air pressure. If the brake booster fails and has to be changed, however, this requires that the costly underpressure sensor also be replaced. As an alternative to this, the underpressure sensor may be disassembled from the defective brake booster and mounted on the new brake booster, but this involves great expenditure of time.

In order to avoid these disadvantages, it is proposed in DE 10 2004 013 191 A to provide an underpressure region which communicates with the underpressure chamber of the brake booster in the master cylinder and to arrange the underpressure sensor in that underpressure region of the master cylinder. A particular construction makes provision for the underpressure sensor having a position sensor of a brake light switch to be integrated in a sensor module and for the entire sensor module to be provided in the underpressure region of the master cylinder. The sensor module comprises a finger-like carrier member, at the tip of which the underpressure sensor and the position sensor are received. In order to position the sensors in the underpressure region of the master cylinder, the carrier with the sensors received at the front side is directed through a channel which is formed in the master cylinder and which opens in the underpressure region.

BRIEF SUMMARY OF THE INVENTION

A feature of the invention is to set out an alternative and in particular improved assembly concept for a master cylinder sensor module.

This feature is achieved by a sensor module for use with a master cylinder, the master cylinder having an input-side activation element and an underpressure region for communicating with an underpressure brake booster. The sensor module comprises an underpressure sensor for detecting an underpressure in the underpressure region of the master cylinder, at least one additional sensor for detecting a signal transmitter which is rigidly connected to the activation element of the master cylinder and a housing which receives the underpressure sensor and the at least one additional sensor. The housing has a housing opening which allows the underpressure sensor to communicate with the underpressure region of the master cylinder and a securing arrangement for fitting the housing to the outer side of the master cylinder.

The fixing arrangement may comprise recesses (for example, bores) for receiving screws or other securing elements by means of which the housing is fitted on the master cylinder at the outer side. Alternatively, the securing arrangement may also comprise a thread which is fitted to the housing in order to screw the housing into the master cylinder. Another embodiment of the securing arrangement comprises a housing shaping which enables the housing to be fitted to the master cylinder by means of press-fitting.

The housing may surround the underpressure sensor and the at least one additional sensor at one or more sides. For instance, the housing may surround the sensors at least at an upper side. In the most simple case, the housing is therefore formed by a plate-like element which covers, for example, a recess in the master cylinder. According to another embodiment, the housing surrounds the sensors at least laterally and at an upper side. Furthermore, it is conceivable for the housing to surround the sensors at least partially at a lower side adjacent to the master cylinder.

The housing opening may be formed at a lower side of the housing adjacent to the master cylinder. However, it would also be conceivable for the housing opening to be provided laterally or at another location of the housing. According to a development, the sensor module comprises a sealing element for underpressure-tight sealing of the housing opening with respect to the master cylinder and in particular with respect to the underpressure region thereof. The sealing element may, for example, be constructed as a sealing ring which surrounds the housing opening. The sealing element for sealing the housing opening may also be constructed on the master cylinder or may, however, be provided loosely between the master cylinder and sensor module.

A common electrical connection may be provided for the underpressure sensor and the at least one additional sensor. The common electrical connection may be constructed on the housing (for example, as a plug type contact). The underpressure sensor and the at least one additional sensor may be arranged together on a printed circuit board which is received in the housing. The printed circuit board may enable a contacting of the sensors or a signal conditioning circuit provided for the sensors via the common electrical connection.

The at least one additional sensor for detecting the signal transmitter connected to the activation element may be a displacement sensor for detecting a path travelled by the activation element. Furthermore, the at least one additional sensor may be a position sensor for detecting when a predetermined position of the activation element has been reached. According to an optional development, the position sensor is part of a brake light switch. The displacement sensor may provide an analogue signal and may be constructed, for example, as a continuous (for example, linear) Hall sensor. Furthermore, the position sensor may provide a binary signal and be constructed, for example, as a binary Hall sensor with two switching states.

According to one embodiment, the sensor module comprises, in addition to the underpressure sensor, both the displacement sensor and the position sensor. Accordingly, at least three sensors are provided. However, other embodiments are also conceivable in which both a displacement sensor and a position sensor but no underpressure sensor are provided.

There may further be provided a circuit device which is constructed to calibrate the displacement sensor on the basis of an output signal of the position sensor. The circuit device may be part of the sensor module or, however, may be integrated outside the sensor module (for example, also in a control device).

According to one embodiment, the displacement sensor and the position sensor may be spaced apart from each other. This spacing may be selected in accordance with a longitudinal extent of the signal transmitter. Both the spacing between the displacement sensor and the position sensor and the longitudinal extent of the signal transmitter may be defined in a movement direction of the activation element or the signal transmitter.

According to one variant, the spacing between the displacement sensor and the position sensor may correspond to approximately half of the length of the signal transmitter. Such a spacing is advantageous, for example, with a signal transmitter which emits electromagnetic radiation (for example, a magnetic element). Depending on the construction of the sensors and the signal transmitter, however, a different spacing may also be selected between the displacement sensor and the position sensor.

The displacement sensor and the position sensor may be constructed to detect electromagnetic radiation, such as, for example, a magnetic flux density. With such an implementation, the displacement sensor may be positioned in such a manner that, in an initial position of the activation element, the displacement sensor is located approximately in a region of a flux density maximum (which results from the signal transmitter). If the sensor module comprises another, second, displacement sensor, the second displacement sensor may be positioned in such a manner that, in an initial position of the activation element, it is located approximately in a region of another flux density maximum. Furthermore, the position sensor may be positioned in such a manner that, in an initial position of the activation element, the position sensor is located approximately in a region between two flux density maxima.

Using the calibration concept, the precision of the travel detection can be increased in such a manner that an output signal of the displacement sensor can also be used for detecting pedal travel (an additional pedal travel sensor can consequently be dispensed with). The pedal travel detection is a significant requirement for the implementation of an electrohydraulic brake system, a regenerative brake system ("hybrid brake system") or similar concepts. Therefore, the sensor module set out in this instance may also be used in connection with such brake systems.

The signal transmitter may be rigidly connected to the activation element in different manners. In the most simple case, the signal transmitter is connected directly to the activation element or is even identical to the activation element. Alternatively, the signal transmitter may also be provided on a structure which is rigidly connected to the activation element. In this structure, there may be, for example, a tappet which is connected to the activation element and which carries the signal transmitter. In this instance, the sensor module may further have a channel (for example, inside a cartridge) for receiving the tappet. According to this embodiment, the housing opening may be arranged in such a manner that the underpressure sensor communicates via the channel with the underpressure region of the master cylinder. Therefore, the housing opening may, for example, be formed by an (with respect to the tappet) input-side opening of the channel or, however, be provided inside the channel.

There is also proposed a master cylinder module having a master cylinder and the sensor module set out in this instance. The master cylinder comprises the input-side activation element and the underpressure region for communication with an underpressure brake booster. The master cylinder module may further itself comprise the underpressure brake booster.

According to a development, the master cylinder module comprises the tappet which is connected to the activation element and which carries the signal transmitter. Furthermore, a channel may be formed on the master cylinder for receiving the tappet. The channel may belong to the underpressure region of the master cylinder and be arranged in order to connect an underpressure chamber of the underpressure brake booster to the housing opening. In this manner, communication of the underpressure sensor with the underpressure chamber is possible.

There is further provided a sensor system having a sensor module which comprises the displacement sensor and the position sensor such as a switching device, which is constructed to calibrate the displacement sensor on the basis of an output signal of the position sensor. This sensor system may be used to simulate a pedal displacement sensor signal on the basis of the output signal of the displacement sensor.

A use of the sensor module may further comprise adjustment of the travelled path that was detected by the displacement sensor and the reaching of the predetermined position which was detected by the position sensor. Such an adjustment may involve, for example, the calibration (of an output signal) of the displacement sensor on the basis of an output signal of the position sensor. The calibration may be carried out when it has been detected that the predetermined position has been reached (that is to say, for example, at a switching point of the position sensor). For the calibration, when the predetermined position is reached, the output signal of the displacement sensor may refer to a reference signal. In this context, it is possible, for example, to adjust an amplification factor for the output signal of the displacement sensor in accordance with the reference signal.

The output signal of the position sensor may be validated. This validation may involve the redundant evaluation of another signal which indicates a brake operation. Such a signal may, for example, be provided by a longitudinal acceleration sensor or a wheel speed sensor.

Based on an output signal of the displacement sensor, other variables can be determined. The determination of these variables is in particular particularly precise and reliable with a previous calibration of the displacement sensor (and optionally a validation of the output signal thereof). For instance, on the basis of an output signal of the displacement sensor, a brake pedal travel and/or an underpressure in an underpressure brake booster may be established. The respective establishment may be carried out on the basis of a mathematical calculation (for example, using a mathematical model).

Other advantages of this invention will become apparent to those skilled in the art from the following detailed description of the preferred embodiments, when read in light of the accompanying drawings.

BRIEF DESCRIPTION OF THE DRAWINGS

FIG. 2 is an enlarged cutout from FIG. 1 which shows a first embodiment of a sensor module;

FIG. 3 shows a second embodiment of a sensor module;

FIG. 4 shows a first embodiment of a signal transmitter cartridge for a sensor module;

FIG. 5 shows a second embodiment of a signal transmitter cartridge for a sensor module;

DETAILED DESCRIPTION OF THE DRAWINGS

Figure 1:
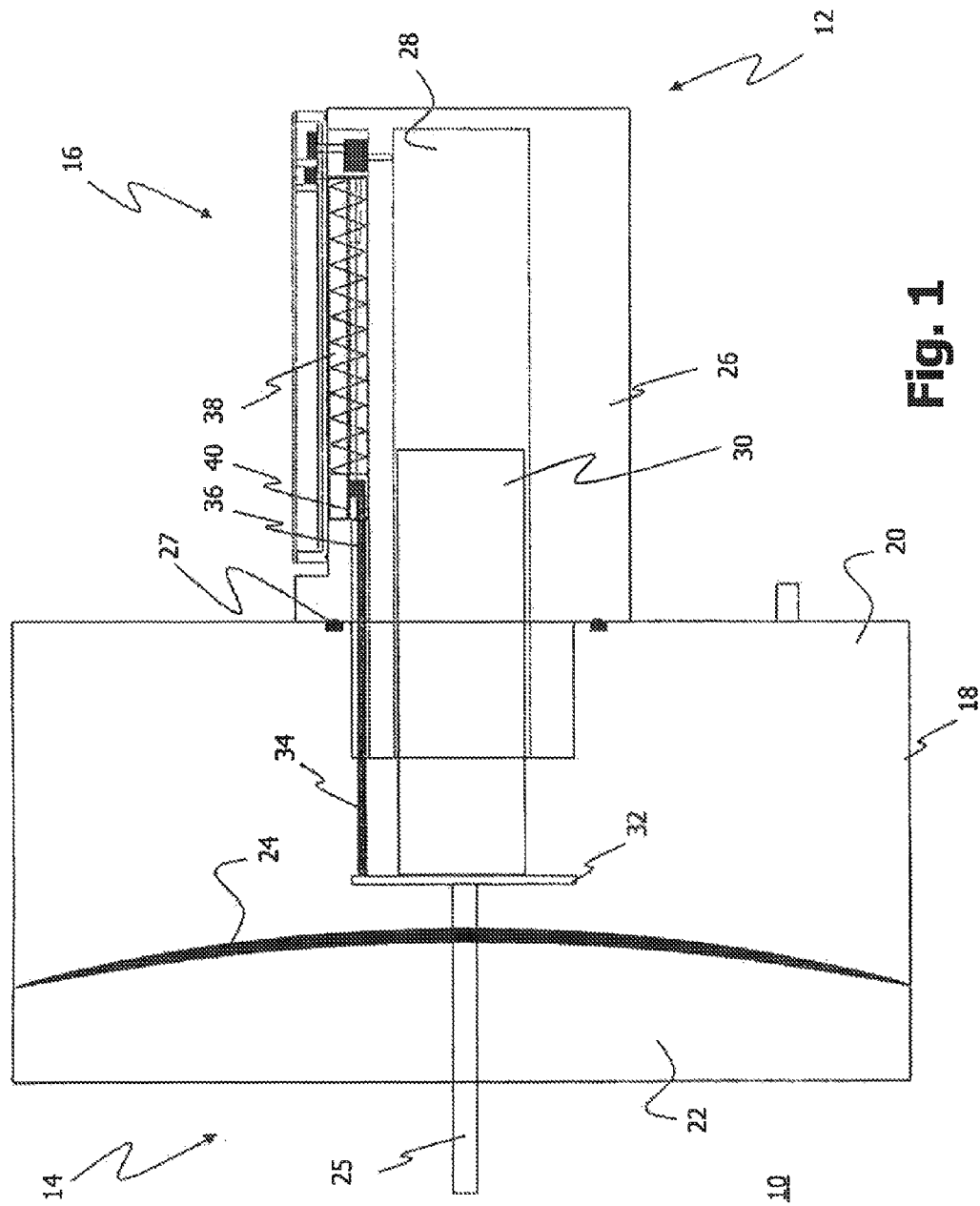
FIG. 1 is a sectioned view of an embodiment of a master cylinder module.

FIG. 1 shows an embodiment of a master cylinder module which is generally designated 10. The master cylinder module 10 comprises a master cylinder 12, an underpressure brake booster 14 which is secured to the master cylinder 12 at the end face and a sensor module 16 which is fitted to the master cylinder 12 at the outer side.

The underpressure brake booster 14 comprises a housing 18. An underpressure chamber 20 and an operating chamber 22 are formed inside the housing 18. The operating chamber 22 is separated from the underpressure chamber 20 by means of a diaphragm 24 which can be displaced in the housing 18 in the manner of a piston. The diaphragm 24 is in turn connected to an input rod 25 so as to transmit force. The input rod 25 is actuated by means of a brake pedal (not illustrated).

The master cylinder 12 comprises a housing 26 which is secured to the housing 18 of the brake booster 14 by means of a sealing element in the form of an O-ring 27. A hydraulic chamber 28 is formed in the housing 26. Within the hydraulic chamber 28, an activation piston (primary piston) 30 which is rigidly connected to the input rod 25 is displaceable guided. Using the activation piston 30, a hydraulic pressure for actuating wheel brakes (not illustrated) can be built up within the hydraulic chamber 28. The brake pressure build-up in the hydraulic chamber 28 is carried out by displacing the activation piston 30 in FIG. 1 to the right. The displacement of the activation piston 30 is carried out by means of the input rod 25 which is connected to the brake pedal and the diaphragm 24. Acting on the activation piston 30 in this instance is, on the one hand, the foot force introduced into the brake pedal by the driver and, on the other hand, the amplification force produced by the brake booster 14 (in conventional manner).

As can be seen in FIG. 1, a plate element 32 is secured to the activation piston 30 at the end face thereof facing the input rod 25. The plate element 32 is arranged concentrically relative to the activation piston 30 and protrudes in a radial direction beyond the activation piston 30. Close to the outer periphery of the plate element 32, a tappet 34 which extends parallel with the activation piston 30 in the direction of the master cylinder housing 26 is rigidly secured. The tappet 34 is constructed as a rod-like element and extends over a channel 36 which is formed in the housing 26 into a recess 38 which is also formed in the housing 26. At the end thereof facing away from the plate element 32, the tappet 34 carries a signal transmitter element 40 for detecting by means of the sensor module 16. Owing to the rigid coupling of the tappet 34 with the activation piston 30, any translatory movement of the activation piston 30 is transmitted directly to the signal transmitter element 40. For this reason, a detection of a movement or position of the signal transmitter element 40 by means of the sensor module 16 enables a statement to be made relating to a movement or position of the activation piston 30.

As shown in FIG. 1, the input rod 25, the plate element 32, the tappet 34 and the activation piston 30 are at least partially arranged in the underpressure chamber 20 of the brake booster 14. Furthermore, by means of the channel 36 which communicates with the underpressure chamber 20 and the recess 38 of the master cylinder housing 26 which communicates with the channel 36, an underpressure region is defined in the master cylinder 12. The tappet 34 with the signal transmitter element 40 fitted thereto extends into this underpressure region.

In order to prevent an underpressure loss in the underpressure chamber 20 by means of the influx of atmospheric air into the underpressure region of the master cylinder 12, the recess 38 of the master cylinder housing 26 is closed in an underpressure-tight manner by means of the sensor module 16. This fact and the configuration of the sensor module 16 is explained in greater detail below with reference to FIG. 2. FIG. 2 is an enlarged cutout of FIG. 1 in the region of the sensor module 16.

As illustrated in FIG. 2, the sensor module 16 comprises a housing 42 which is fitted to the outer side of the housing 26 of the master cylinder 12. The assembly of the housing 42 of the sensor module 16 on the master cylinder housing 26 is carried out in such a manner that the recess 38 in the master cylinder housing 26 is closed in an underpressure-tight manner. For this reason, a sealing element 44 is provided around the recess 38 between the housing 42 of the sensor module 16 and the master cylinder housing 26. In this manner, ambient air is prevented from being introduced via the recess 38 and the channel 36 in the master cylinder housing 26 into the underpressure chamber 20 of the brake booster 14.

In the embodiment according to FIG. 2, the housing 42 of the sensor module 16 is secured to the master cylinder housing 26 by means of screws (not illustrated). Owing to the suction effect in the underpressure region of the master cylinder 12, however, the housing 42 can also be fitted to the outer side of the master cylinder 12 using less stable fixing arrangements. Thus, for example, folding or catch connections could be used for the assembly of the housing 42.

In the embodiment according to FIG. 2, the housing 42 comprises a first housing element which defines a lower side 46 and a side wall 48 of the housing 42, and a second housing element which is constructed as a cover 50 and which closes the first housing element at the upper side. A printed circuit board (PCB) 52 is received in the housing 42. An underpressure sensor 54, a linear or planar displacement sensor 56 and a circuit device 58 are mounted on the printed circuit board 52.

The underpressure sensor 54 enables the detection of an underpressure in the underpressure region of the brake booster 14. For this purpose, an opening 60 which is formed in the lower side 46 of the housing 42 enables the underpressure sensor 54 to communicate with the recess 38 formed in the master cylinder housing 26 and consequently—via the channel 36—with the underpressure chamber 20 of the brake booster 14. The underpresure sensor 54 (or the printed circuit board 52) closes the housing opening 60 in an underpressure-tight manner with respect to an inner space of the housing 42 of the sensor module 16.

As shown in FIG. 2, the underpressure sensor 54 is itself arranged in a chamber 64 formed in the inner space of the housing 42. The housing cover 50 has in the region of the chamber 62 a cover opening 64. For this reason, there is atmospheric pressure inside the chamber 62 in order to enable a pressure-difference-based underpressure detection by means of the underpressure sensor 54. The chamber 62 itself is sealed in an underpressure tight manner with respect to the remaining inner space of the housing 42.

The displacement sensor 56 is constructed in a linear or planar manner on the printed circuit board 52 and can therefore not be seen directly in the sectioned view according to FIG. 2. In the embodiment according to FIG. 2, the displacement sensor 56 is constructed as a continuous or linear Hall sensor for detecting a path travelled by the activation piston 30. The detection of the path travelled by the activation piston 30 is carried out indirectly via detection of the path travelled by the signal transmitter element 40 which is rigidly connected to the activation piston 30. The signal transmitter element 40 is constructed in the present embodiment as a permanent magnet whose magnetic field is detected by means of the displacement sensor 56 which is constructed as a Hall sensor.

The circuit device 58 is electrically connected to both the underpressure sensor 54 and the displacement sensor 56 and contains suitable signal conditioning circuits for the two sensors 54, 56. In one embodiment, the circuit device 58 is constructed as an ASIC (Application Specific Integrated Circuit).

The circuit device 58 provides the output signals thereof via a common electrical connection which is not illustrated in FIG. 2 (for example, via a multi-pole electrical plug type connector) of an external control unit. With regard to the electrical interfaces, various configurations are available (for example, CAN, SENT, PSI5, PWM, analogue, etcetera). The external control unit may be a control device (Electronic Control Unit, ECU). According to an alternative configuration, the switching device 58 itself comprises the required control device functionalities according to the "Smart Sensor" concept. The circuit device 58 may in this instance (for example, via a CAN bus) be connected to a superordinate control system.

As can be seen in FIG. 2, there is arranged in the recess 38, a resilient element 66 which is constructed as a helical spring and which applies a restoring force to the tappet 34 which carries the signal transmitter element 40 (in FIG. 2 to the left). Using the resilient element 66, it is ensured that, after a braking operation is complete, the tappet 34 with the signal transmitter element 40 always returns to the initial position thereof illustrated in FIG. 2. The signal transmitter element 40 is fitted to the tappet 34 by means of a sliding member 68. The sliding member 68 is in turn movably guided in a groove 69 which is constructed in a side wall of the recess 38 or a separate signal transmitter cartridge.

In the embodiment according to FIG. 2, a hydraulic pressure sensor 70 is further provided in the recess 38 of the master cylinder housing 26. The hydraulic pressure sensor 70 is secured to the base of the recess 38 and communicates via a hole 72 with the hydraulic chamber 28. The hole 72 is sealed in a hydraulically-tight manner with respect to the recess 38 by means of the pressure sensor 70. As shown in FIG. 2, the hydraulic pressure sensor 70 is electrically contacted by means of the switching device 56. In a similar manner to that described with respect to the sensors 54, 56, the circuit device 58 also contains a signal conditioning circuit for the hydraulic sensor 70 and provides a corresponding output signal which can be picked up via the common electrical connection.

In the embodiment of the sensor module 16 illustrated in FIG. 2, the inner space of the housing 42 does not necessarily have to be constructed in a vacuum-tight manner. The underpressure-tight closure of the underpressure region of the master cylinder 12 is carried out via the housing lower side 46 in combination with the peripheral sealing element 44 between the housing lower side 46 and the master cylinder housing 26. An underpressure leak via the housing opening 60 is prevented by the housing opening 60 being closed in an underpressure-tight manner by means of the underpressure sensor 54 (or the printed circuit board 52). FIG. 3 shows a second embodiment of the sensor module 16 in which there is also underpressure in the inner space of the housing 42. Elements which are similar are given the same reference numerals as in the first embodiment below.

In the embodiment of the sensor module 16 illustrated in FIG. 3, owing to a different configuration of the underpressure sensor 54, no pressure-difference-based underpressure detection is required. For this reason, there may also be underpressure in the inner space of the housing 42 and the housing shape may therefore be simplified. In the embodiment according to FIG. 3, the housing 42 surrounds the underpressure sensor 54 and displacement sensor 56 only at the side and top. The underpressure region of the master cylinder 12 can therefore continue as far as into the inner space of the housing 42.

In the embodiment according to FIG. 2, the signal transmitter element 40 may be provided in a cartridge for insertion in the recess 38 of the master cylinder housing 26. FIG. 4 illustrates an embodiment of such a cartridge 80. As shown in FIG. 4, the cartridge 80 comprises a cartridge housing 82 which defines at the inner side a channel for a translatory movement of the signal transmitter element 40. In the cartridge 80, the signal transmitter element 40 is preconfigured on the sliding member 68 and is pretensioned by the resilient element 66 into the initial position thereof according to FIG. 4. Within the cartridge housing 82, the groove 69 for a guided movement of the sliding member 68 is constructed. In order to assemble the cartridge 80, it is inserted into the recess 38 of the master cylinder housing 26 in a first step. In a second step, the tappet 34 is connected to the sliding member 68 (for example, by means of a catch, plug or bayonet type connection). The cartridge housing 82 has an opening which is not illustrated in FIG. 4 in order to allow the underpressure sensor 54 to communicate with the inner space of the cartridge housing 82 and consequently the underpressure region of the master cylinder 12.

FIG. 5 illustrates another embodiment of a cartridge 80. While the signal transmitter element 40 according to FIG. 4 is a magnetic element for detection by means of a Hall sensor, FIG. 5 illustrates a signal transmitter element 40 in the form of a reflector, transducer or similar component which is located outside the cartridge housing 82. The displacement sensor 56 is adapted accordingly.

The cartridges 80 illustrated in FIGS. 4 and 5 may either form a separate module or be combined with the sensor module 16 to form a single module. In the latter construction mentioned, no separate fixing arrangement for the cartridge 80 is required. The cartridge 80 may instead be fitted together with the housing 42 of the sensor module 16 to the master cylinder 12.

Figure 6:
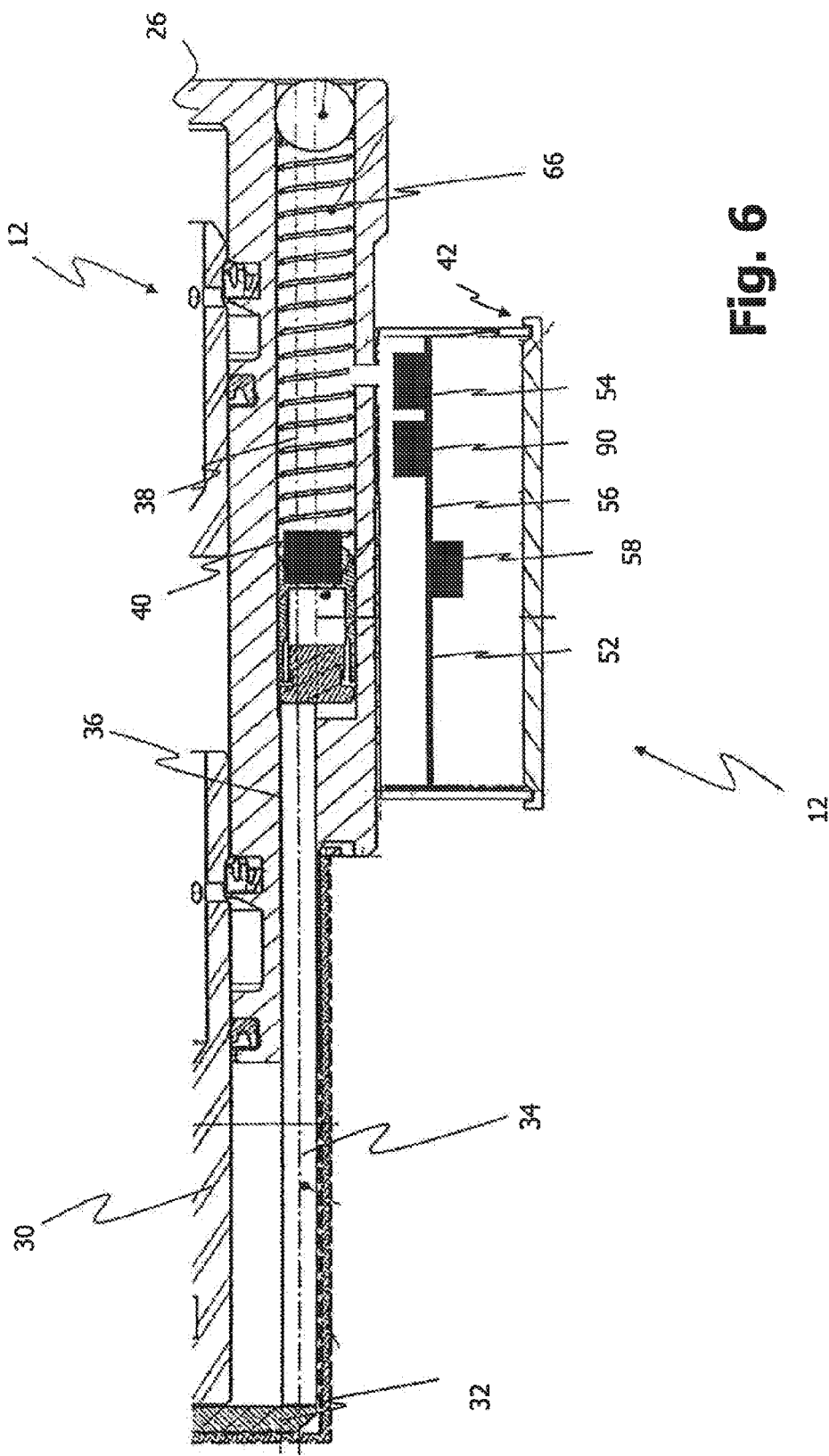
FIG. 6 shows another embodiment of a master cylinder module.

FIG. 6 illustrates another embodiment of a master cylinder module 10. In the embodiment according to FIG. 6, the sensor module 16 comprises a position sensor 90 in addition to the underpressure sensor 54 and the displacement sensor 56.

The position sensor 90 enables detection of when a predetermined position of the signal transmitter element 40 has been reached (and consequently of the activation piston 30). The position sensor 90 may, for example, be part of a brake light switch (not illustrated) and may be configured as a binary (switching) Hall sensor. Whilst the displacement sensor 56 provides an analogue signal, which represents a cutout of the path of the activation piston 30 (and consequently the pedal travel), the position sensor 90 provides an ON/OFF signal which can be used for switching the brake light on and off. However, it is also possible, using the ON/OFF signal of the position sensor 90, to calibrate the analogue signal of the displacement sensor 56 in order to thus reproduce a pedal travel signal with adequate precision. Owing to this gain in precision, the pedal travel may be established based on a signal of the displacement sensor 56 and a pedal displacement sensor may be saved. Using the calibration, the temperature dependency of the travel measurement may in particular be substantially reduced.

Figure 7:
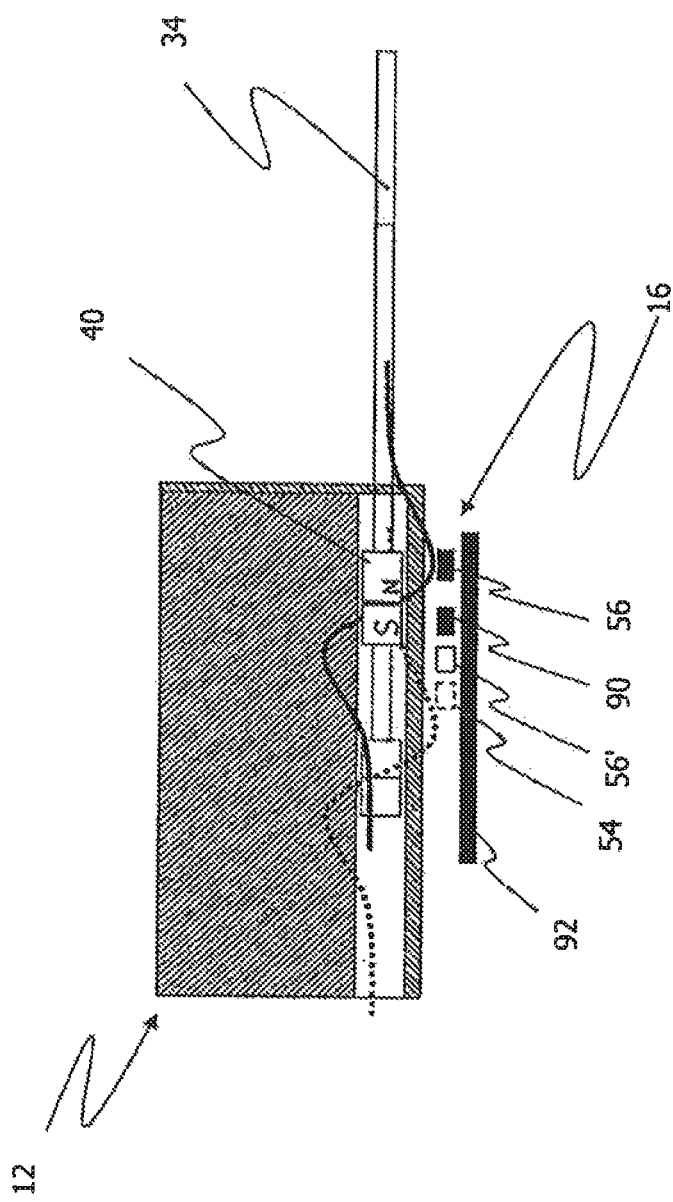
FIG. 7 shows another embodiment of a master cylinder module.

In the embodiment according to FIG. 7, the sensor module 16 comprises in addition to the underpressure sensor 54 and in addition to the displacement sensor 56 and position sensor 90 another displacement sensor 56'. As explained below, the underpressure sensor 54 may be dispensed with in many embodiments since the underpressure can also be calculated from a model based on the displacement sensor signal.

The position sensor 90 may in turn assume two switching states and may be configured, for example, as a binary (switching) Hall sensor. The displacement sensor 56 may, however, be a continuous Hall sensor. In one embodiment, the position sensor 90 which is constructed as a binary Hall sensor comprises a continuous Hall sensor and a comparator which is arranged downstream of the continuous Hall sensor. The comparator subjects the output signal of the continuous Hall sensor to a threshold value decision and outputs, depending on the decision, either a logical "0" ("OFF") or a logical "1" ("ON").

Whilst the displacement sensor 56 consequently provides an analogue (continuous) signal, which represents a cutout of the travel of the activation piston 30 (and consequently the pedal travel), the position sensor 90 provides an ON/OFF signal. This ON/OFF signal can be used for switching the brake light on and off. In addition or alternatively, however, it is also possible, using the ON/OFF signal of the position sensor 90, to calibrate the analogue signal of the displacement sensor 56 in order to thus reproduce a pedal travel signal with adequate precision.

In specific applications, the pedal travel may be established on the basis of an output signal of the displacement sensor 56 and a separate pedal displacement sensor can thus be saved. The pedal travel detection is a significant requirement for the implementation of an electrohydraulic brake system, a regenerative brake system ("hybrid brake system") or similar concepts. Therefore, the sensor module set out in this instance can also be used together with such brake systems.

With reference to the embodiment according to FIG. 7, exemplary concepts for the travel detection and the position detection with a signal transmitter element 40 which is constructed as a magnetic element will be explained below. As already noted above, however, it is in principle also possible to use such signal transmission elements which are based on other physical (for example, optical) concepts.

In the embodiment according to FIG. 7, the master cylinder 12 is made from a non-magnetic material such as aluminium. The signal transmitter element 40 comprises a permanent magnet, for example, comprising a neodymium/iron/boron alloy. The magnetisation direction of the signal transmitter element 40 extends parallel with the translatory movement direction of the tappet 34 (as illustrated in FIG. 7 by the magnetic south pole "S" and the magnetic north pole "N"). FIG. 7 illustrates the resulting profile of the magnetic flux density in the initial position of the tappet 34 (solid line), that is to say, with the brake pedal not actuated, and in the end position of the tappet 34 (dotted line), that is to say, with the brake pedal fully pressed down.

Below the position sensor 90, the displacement sensor 56 and the optional additional displacement sensor 56' there is arranged a flux conducting sheet 92 of soft-magnetic material of high magnetic permeability. The flux conducting sheet 92 screens the sensors 56, 56', 90 from external interference fields and therefore enables a higher level of measurement precision. The flux conducting sheet 92 may be produced, for example, from a µ metal.

Figure 8:
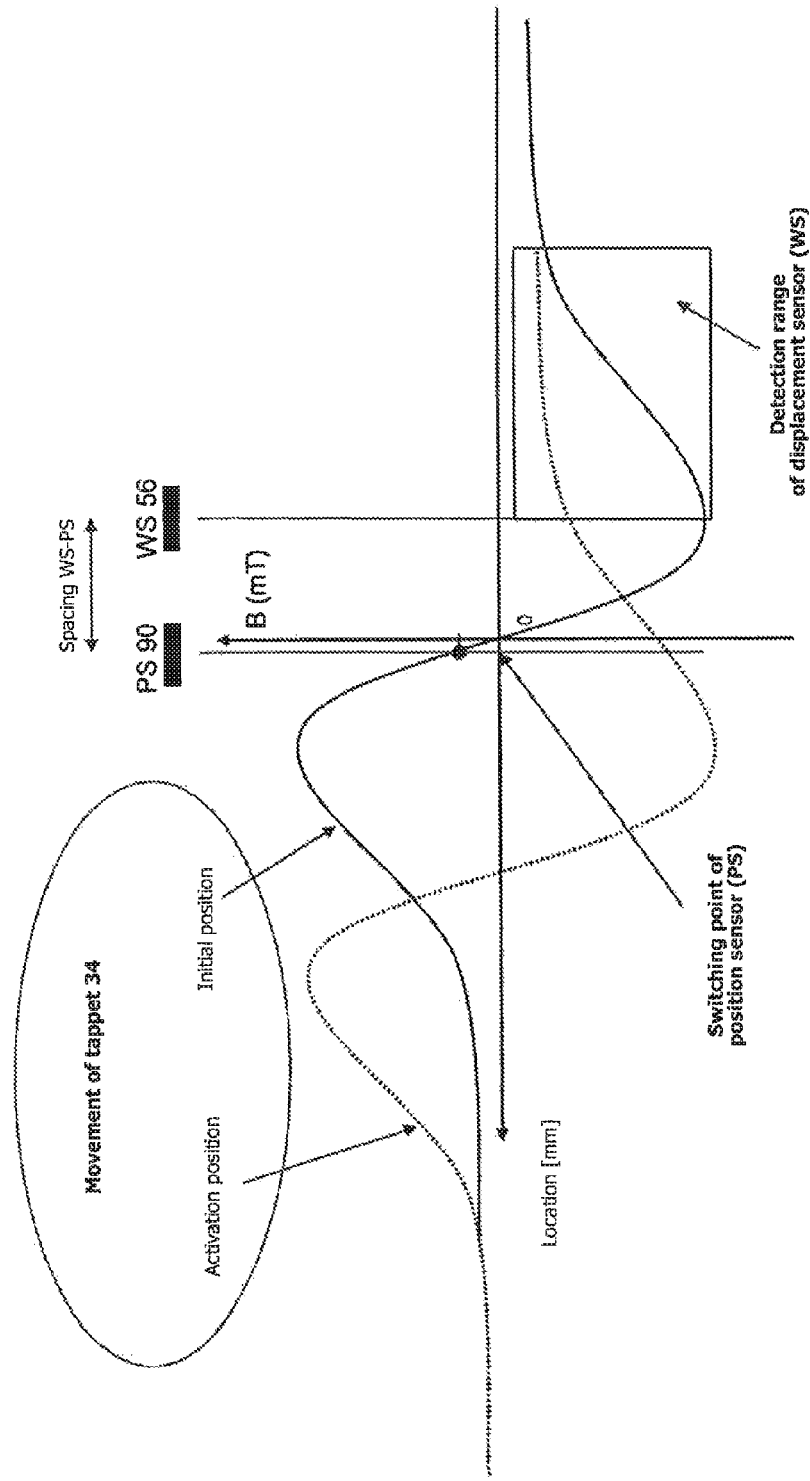
FIG. 8 is a schematic graph which illustrates the path of the magnetic flux density for the embodiment according to FIG. 8.

The profiles of the magnetic flux density drawn merely schematically in FIG. 7 are illustrated more clearly in the graph of FIG. 8. More precisely, FIG. 8 illustrates the location-dependent profile of the magnetic flux density B along a straight line which extends parallel with the tappet 34 and which contains both the displacement sensor 56 and the position sensor 90. The continuous line illustrates as in FIG. 7 the flux density profile in the initial position of the tappet 34 with the brake pedal not actuated. The dotted line characterises the flux density profile in the end position of the tappet 34, that is to say, with the brake pedal fully pressed down.

It can clearly be seen that the flux density path has two maxima. The two maxima are arranged in the region of the two poles of the magnetic signal transmitter element 40. The flux density has in the portion between the two maxima a substantially linear profile. Furthermore, the flux density has in the region at the far side of the two maxima an asymptotic monotonous profile, respectively.

FIG. 8 also illustrates the position of the displacement sensor 56 and the position sensor 90 with respect to the flux density profile. It can clearly be seen that the spacing between the displacement sensor 56 and the position sensor 90 is selected in accordance with a longitudinal extent of the signal transmitter element 40. More precisely, the spacing between the displacement sensor 56 and the position sensor 90 corresponds to approximately half of the length of the signal transmitter element 40. This fact can be seen in that the displacement sensor 56 in the initial position of the tappet 34 is located approximately in the region of a flux density maximum, whilst the position sensor 90 in the initial position is located approximately in the region between the two flux density maxima.

The above-explained positions of the displacement sensor 56 and the position sensor 90 with respect to the flux density profile produce the switching point of the position sensor 90 illustrated in FIG. 8 and detection range of the displacement sensor 56. In the initial position of the tappet 34, the position sensor 90 is located in the flux density portion that has a steep linear profile. Even a slight movement of the tappet 34 from the initial position thereof therefore brings about a significant change of the magnetomotive force of the position sensor 90 which leads to a high level of detection precision. As can be seen in FIG. 8, the switching point of the position sensor 90 can therefore be positioned very close to the turning point of the flux density profile.

The detection range of the displacement sensor 56 is, however, selected in such a manner that it extends from the location of the highest magnetomotive force (flux density maximum) in the direction of the asymptotic monotonous profile. If the tappet 34 is pushed with respect to the initial position thereof in the direction of the end position, the signal transmitter element 40 moves away from the displacement sensor 56, whereby a monotonous reduction of the magnetomotive force of the displacement sensor 56 (and a corresponding monotonous profile of a sensor output signal) results. The magnetic flux density has in the detection range illustrated in FIG. 8 a less steep profile than in the region between the two flux density maxima. Although the measurement precision is reduced to some degree, it is in favour of a substantially larger measurement range with monotonously changing magnetomotive force.

Figure 9:
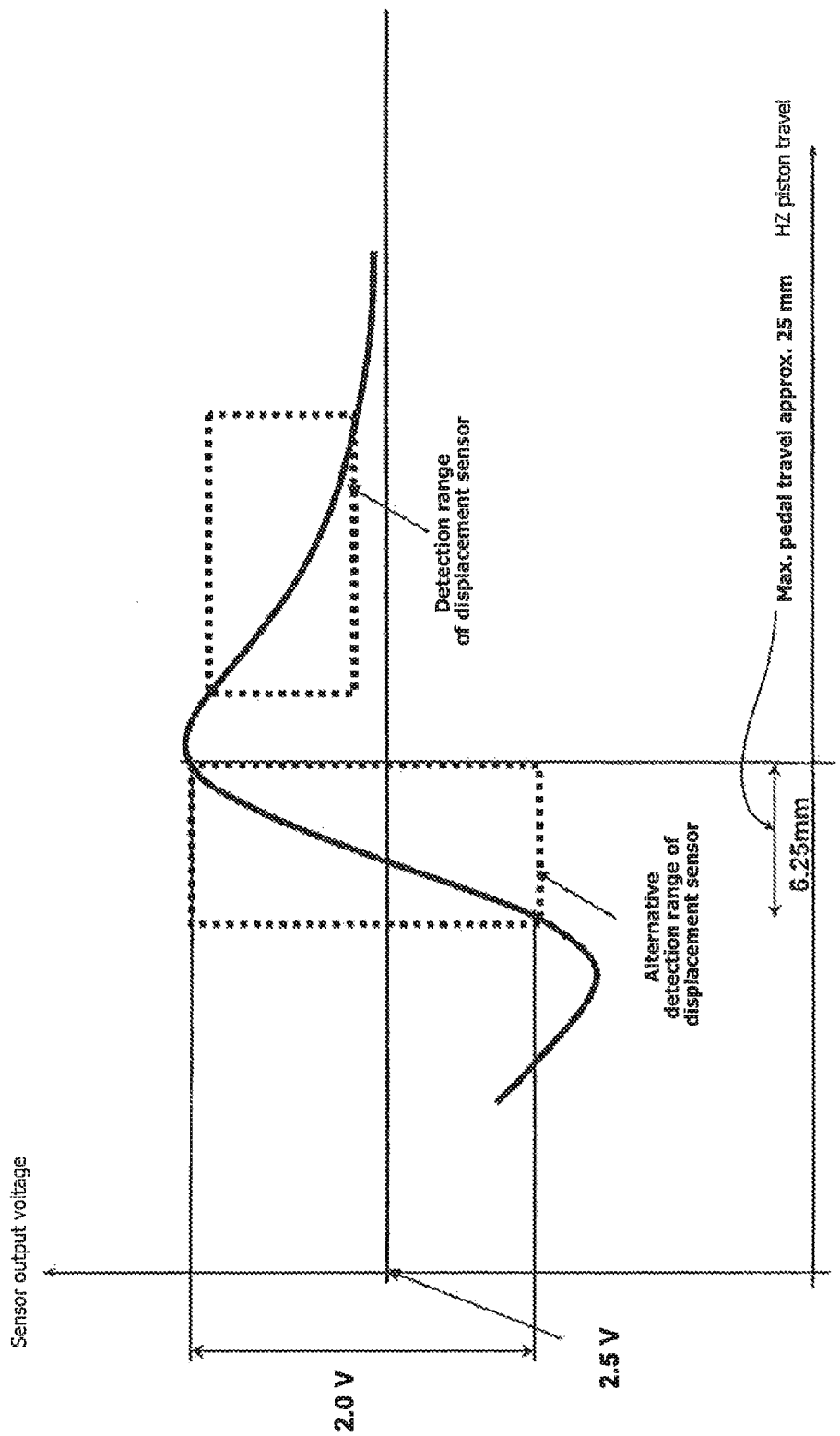
FIG. 9 is a schematic graph which illustrates the path of a sensor output signal and the possible selection of detection ranges.

FIG. 9 illustrates the profile of an output signal of the displacement sensor 56, that is to say, the sensor output voltage, in accordance with the path travelled by the tappet 34 and consequently by the activation piston 30 of the master cylinder 12. The path travelled by the activation piston 30 is directly proportional to the pedal travel so that the pedal travel can be determined from the path travelled by the activation piston 30 by means of a proportionality factor. The path travelled by the activation piston 30 can in turn be established from the change of the sensor output voltage of the displacement sensor 56, using the graph illustrated in FIG. 9.

In FIG. 9, both the detection range of the displacement sensor 56 illustrated in FIG. 8 and an alternative detection range for the displacement sensor 56 are illustrated. The alternative detection range is arranged between the two flux density maxima. As already explained above, the alternative detection range enables a higher level of precision of the travel detection, but possibly at the expense of the maximum detectable travel of the activation piston 30. Of course, the position of the position sensor 90 illustrated in FIG. 8 could also be changed, for example, as illustrated in FIG. 8 for the displacement sensor 56.

As shown in the embodiment according to FIG. 7, there may be provided in addition to the displacement sensor 56 an additional displacement sensor 56' which is arranged with respect to the displacement sensor 56 spatially offset in the movement direction of the tappet 34. The displacement sensor 56 is provided in the region of a first maximum of the flux density profile and the additional sensor 56' in the region of the second maximum. The detection and evaluation of the output signals of both displacement sensors 56, 56' increases the precision of the path detection. Furthermore, it is possible to validate the output signals of both displacement sensors 56, 56' with respect to each other. In this manner, the failure of a displacement sensor 56, 56' can be identified. Furthermore, the redundancy increases the reliability of the sensor module 12. Although not illustrated in the embodiment according to FIG. 7, a redundant position sensor could be provided in a similar manner.

Figure 10:
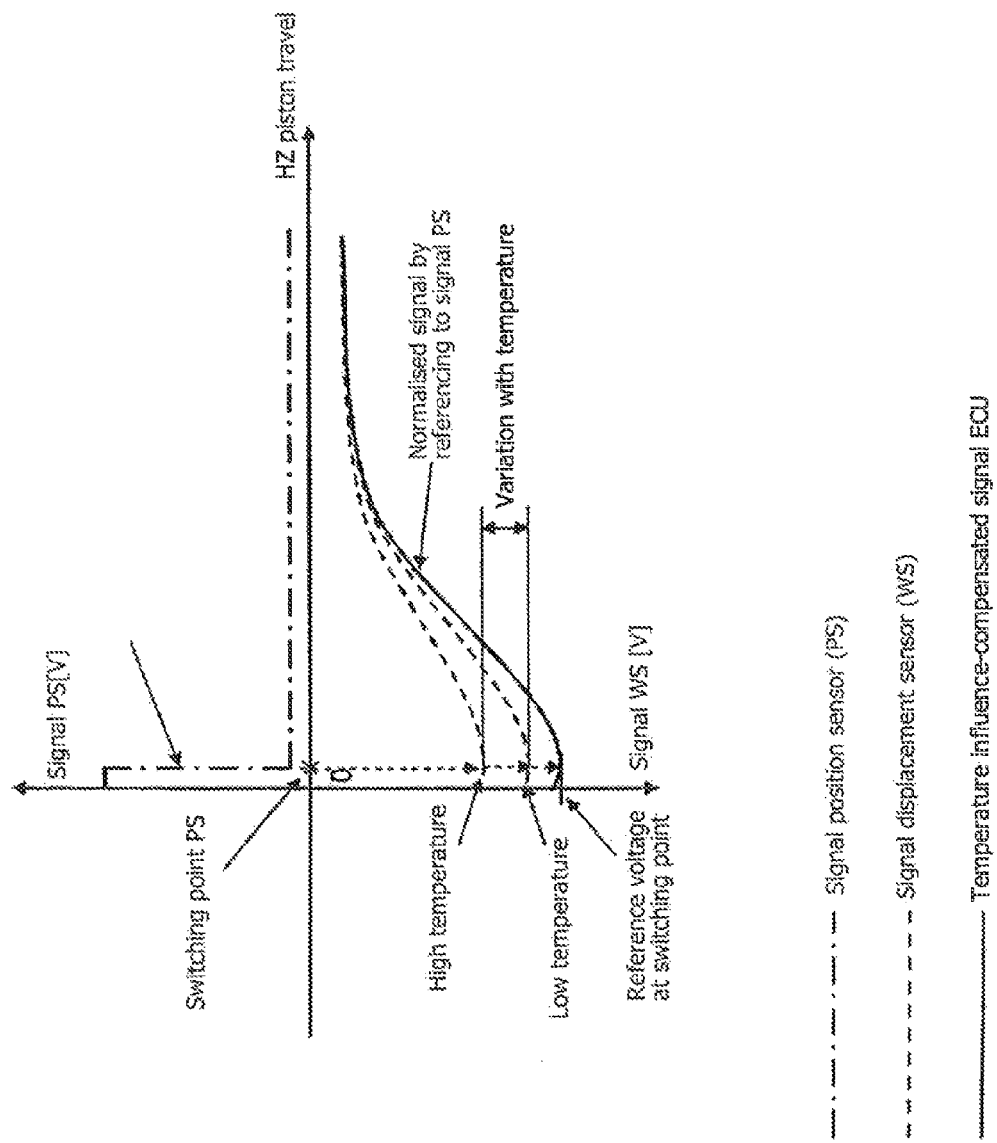
FIG. 10 is a schematic graph which illustrates a calibration concept.

With reference to the graph according to FIG. 10, the calibration of the displacement sensor 56 based on an output signal of the position sensor 90 will be explained below. Using this calibration, in particular the temperature dependency of the travel measurement can be substantially reduced.

The graph according to FIG. 10 illustrates in the upper half the output signal (output voltage) of the position sensor 90 and in the lower half the output signal (output voltage) of the displacement sensor 56 in accordance with the path travelled by the activation piston 30 from the initial position thereof. As shown in FIG. 10, the output signal of the position sensor 90 shows the anticipated binary profile with a jump of the signal level at a predefined switching point. In practice, it has been found that the position of the switching point has no significant temperature dependency.

The profile of the output signal of the displacement sensor 56 illustrated in the lower half of the graph in FIG. 10 shows the anticipated continuous profile in accordance with the continuous change of the magnetomotive force of the displacement sensor 56. The strong dependency of the profile of the output signal of the displacement sensor 56 on the temperature can be clearly seen.

In order to compensate for the temperature dependency of the output signal of the displacement sensor 56, a calibration of this output signal based on the substantially temperature-independent switching point of the position sensor 90 is proposed. More precisely, when the switching point of the position sensor 90 is detected, the output signal of the displacement sensor 56 refers to a reference signal. In this context, an amplification factor for the output signal of the displacement sensor 56 is adjusted in such a manner that the standardised signal (reference signal) illustrated in FIG. 10 as a solid line is always produced. The adjustment of the amplification factor and the signal amplification may be carried out in an ECU in order to achieve a temperature-influence-compensated signal. The calibration may be carried out again each time the brake pedal is actuated.

Figure 11:
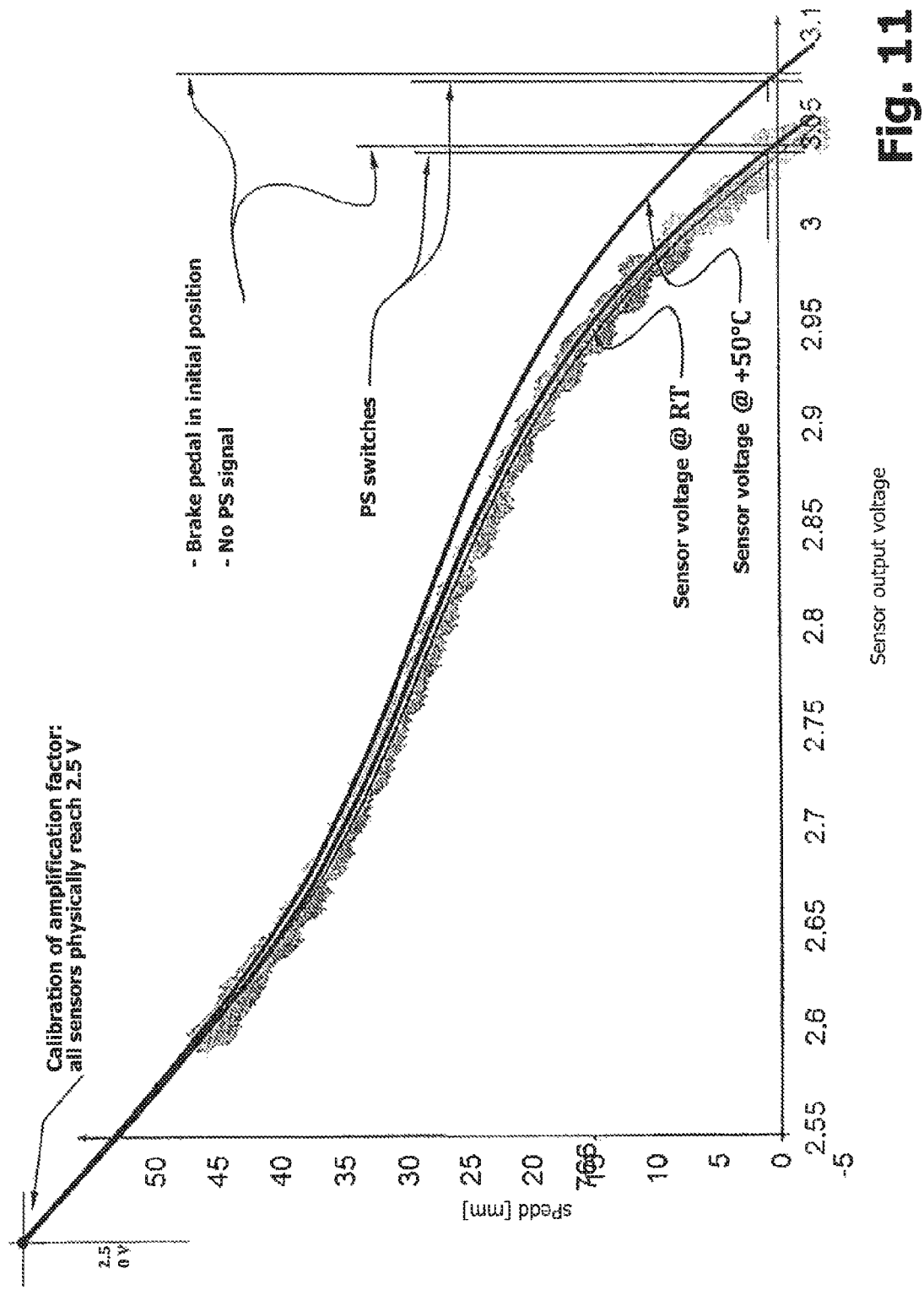
FIG. 11 is a schematic graph which further illustrates the calibration concept.

FIG. 11 illustrates in another graph the profile of the sensor output voltage of the displacement sensor 56 in accordance with the pedal travel at ambient temperature and at a temperature of 50° C. The strong temperature dependency of the sensor output signal can clearly be seen again. Also illustrated in FIG. 11 is the switching point of the position sensor 90. This switching point, which is defined with reference to the initial position of the tappet 34 or the activation piston 30, has practically no temperature dependency and is therefore suitable as a reference point for the calibration of the displacement sensor 56. As can also be seen in FIG. 11, the output signal of the displacement sensor 56 which is constructed as a Hall sensor moves closer to the asymptomatic value 2.5 V with increasing pedal travel. This fact enables the calibration of the displacement sensor 56 on the basis of the above-mentioned selection of the amplification factor.

According to a development of the embodiments, the output signal of the position sensor 90 can be validated on the basis of another signal which indicates a brake operation. If, for example, on the basis of an output signal of a wheel speed sensor or a longitudinal acceleration sensor, a brake operation is recognised, without the position sensor 90 changing its switching status, a malfunction may be concluded.

Figure 12:
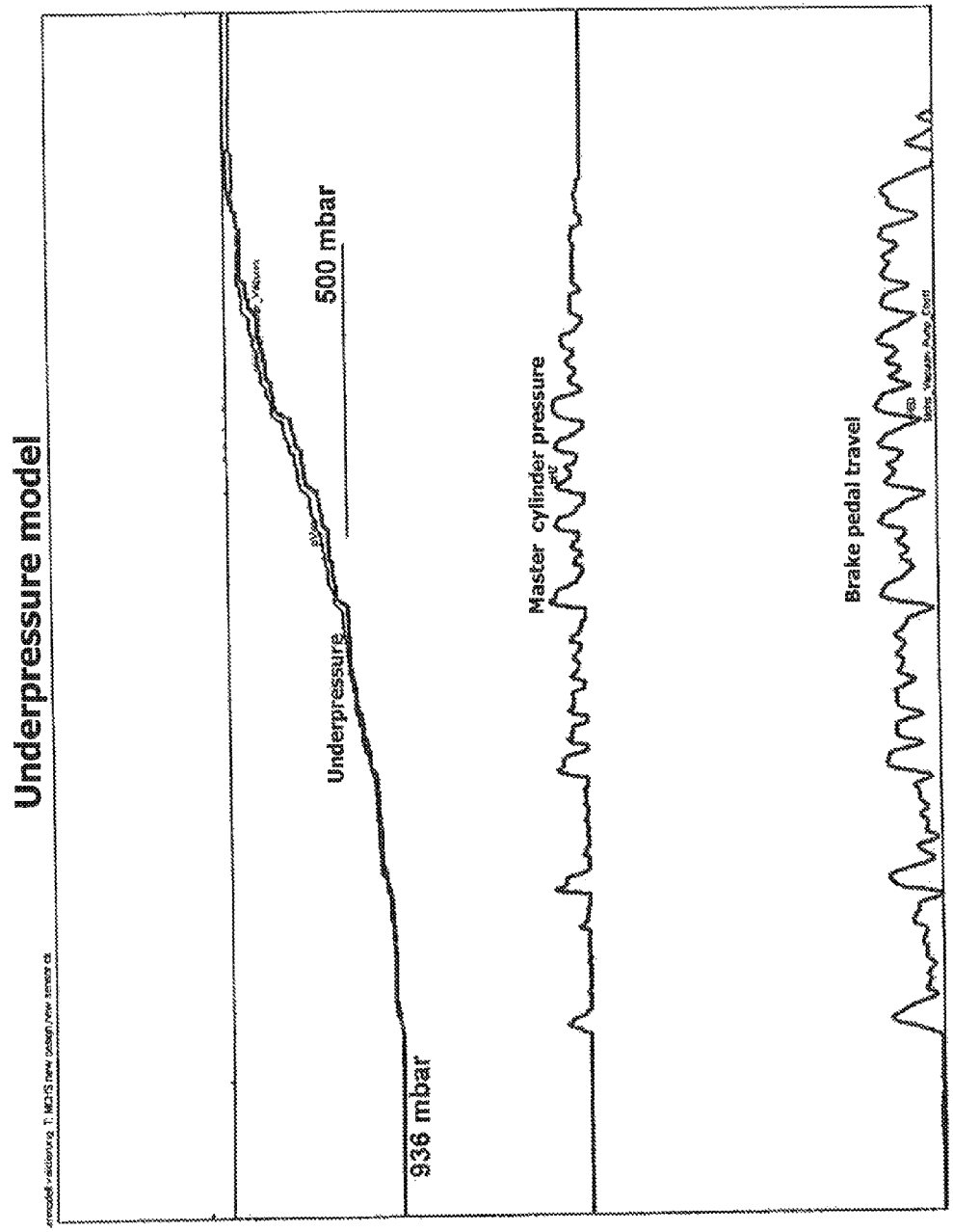
FIG. 12 is a schematic graph which illustrates the determination of the brake booster underpressure on the basis of the brake pedal travel.

FIG. 12 explains the correlation between the brake pedal travel, as can be determined, for example, on the basis of the output signal of the displacement sensor 56 and the underpressure in the underpressure chamber 20 of the brake booster 14 (cf. FIG. 1). It has been found that, by means of a mathematical model, the underpressure illustrated in FIG. 12 can be brought into a relationship with the brake pedal travel also illustrated in FIG. 12. Using this model, the underpressure in the brake booster 14 can consequently be established based on the output signal of the displacement sensor 56. In some embodiments, it is therefore possible to dispense with the underpressure sensor illustrated, for example, in FIG. 2. It is also possible in some embodiments to dispense with a separate pedal displacement sensor which may be provided in other embodiments in addition to the displacement sensor 56.

As can be seen from the embodiments, the sensor module concept set out in this instance enables simplified assembly of the sensors on the master cylinder. An extremely great variety of sensors (optional underpressure sensor for identification of system malfunction, path sensors, for example, for pedal travel establishment, position sensors, for example, for brake light switches, etc.) can be integrated in a single housing, which can be fitted in a simple manner to the outer side of the master cylinder. The sensor signals may be read by means of a common electrical connection and mutually validated or calibrated.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A sensor module for use with a master cylinder which has an input-side activation element and an underpressure region for communicating with an underpressure brake booster (14), the sensor module comprising:
   an underpressure sensor for detecting an underpressure in the underpressure region of the master cylinder;
   at least one additional sensor for detecting a signal transmitter which is rigidly connected to the activation element of the master cylinder; and
   a housing which receives the underpressure sensor and the at least one additional sensor, the housing having a housing opening which allows the underpressure sensor to communicate with the underpressure region of the master cylinder, and a securing arrangement for fitting the housing to an outer side of the master cylinder.

2. The sensor module according to claim 1, the housing surrounding the underpressure sensor and the at least one additional sensor at least at an upper side and the housing opening being formed at a lower side of the housing adjacent to the master cylinder.

3. The sensor module according to claim 1, further comprising a sealing element for sealing the housing opening with respect to the master cylinder.

4. The sensor module according to claim 1, further comprising a common electrical connection for the underpressure sensor and the at least one additional sensor.

5. The sensor module according to claim 1, the underpressure sensor and the at least one additional sensor being arranged together on a printed circuit board in the housing.

6. The sensor module according to claim 1, further comprising a channel for receiving a tappet which is connected to the activation element of the master cylinder, the tappet carrying the signal transmitter element.

7. The sensor module according to claim 6, the underpressure sensor communicating with the underpressure region of the master cylinder via the channel.

8. A master cylinder module (10) comprising:
   a master cylinder which has an input-side activation element and an underpressure region for communicating with an underpressure brake booster; and
   a sensor module according to claim 1.

9. The master cylinder module according to claim 8, further comprising a tappet which is connected to the activation element of the master cylinder, the tappet carrying the signal transmitter element.

10. The master cylinder module according to claim 9, further comprising a channel which is formed on the master cylinder for receiving the tappet, the channel belonging to the underpressure region of the master cylinder and being arranged in order to connect an underpressure chamber of the underpressure brake booster to the housing opening.

11. The sensor module according to claim 1, the at least one additional sensor being a displacement sensor for detecting a path travelled by the activation element.

12. The sensor module according to claim 11, the displacement sensor providing an analogue signal and being constructed as a continuous Hall sensor and/or the position sensor providing a binary signal and being constructed as a binary Hall sensor.

13. Use of a sensor module according to claim 11 for simulating a signal of a pedal displacement sensor on the basis of an output signal of the displacement sensor.

14. The sensor module according to claim 11, the at least one additional sensor being a position sensor for detecting when a predetermined position of the activation element has been reached.

15. The sensor module according to claim 14, the position sensor being part of a brake light switch.

16. The sensor module according to claims 14 the displacement sensor and the position sensor being provided and the displacement sensor being constructed so as to be able to be calibrated on the basis of an output signal of the position sensor.

17. The sensor module according to claim 14, comprising a switching device which is constructed to calibrate the displacement sensor based on an output signal of the position sensor.

18. The sensor module according to claim 14, the displacement sensor and the position sensor being spaced apart from each other and the spacing being selected in accordance with a longitudinal extent of the signal transmitter.

19. The sensor module according to claim 18, the spacing between the displacement sensor and the position sensor corresponding to approximately half of a length of the signal transmitter element.

20. Use of a sensor module according to claim 14 for calibrating the displacement sensor on the basis of an output signal of the position sensor.

21. Use according to claim 20, the calibration being carried out when it is detected that the predetermined position has been reached.

22. Method according to claim 21, an output signal of the displacement sensor referring to a reference signal when the predetermined position has been reached.

23. The sensor module according to claim 14, the displacement sensor and/or the position sensor being constructed to detect a magnetic flux density.

24. The sensor module according to claim 23, the displacement sensor being positioned in such a manner that, in an initial position of the activation element, the displacement sensor is located approximately in a region of a first flux density maximum.

25. The sensor module according to claim 23, the position sensor being positioned in such a manner that, in an initial position of the activation element, the position sensor is located approximately in a region between two flux density maxima.

* * * * *